(12) United States Patent
Ferri et al.

(10) Patent No.: US 10,267,653 B2
(45) Date of Patent: Apr. 23, 2019

(54) POSITION SENSOR AND METHOD FOR DETERMINING A POSITION OF A TIMEPIECE SETTING STEM

(71) Applicant: The Swatch Group Research and Development Ltd, Marin (CH)

(72) Inventors: Yvan Ferri, Lausanne (CH); David Hoover, La Sarraz (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 201 days.

(21) Appl. No.: 15/514,729

(22) PCT Filed: Sep. 22, 2015

(86) PCT No.: PCT/EP2015/071683
§ 371 (c)(1),
(2) Date: Mar. 27, 2017

(87) PCT Pub. No.: WO2016/062479
PCT Pub. Date: Apr. 28, 2016

(65) Prior Publication Data
US 2017/0241805 A1    Aug. 24, 2017

(30) Foreign Application Priority Data
Oct. 20, 2014 (EP) .................................. 14189482

(51) Int. Cl.
*G01D 5/14* (2006.01)
*G01S 5/00* (2006.01)
(Continued)

(52) U.S. Cl.
CPC .............. *G01D 5/14* (2013.01); *G01S 5/0081* (2013.01); *G01S 5/22* (2013.01); *G04C 3/004* (2013.01); *G01S 5/18* (2013.01)

(58) Field of Classification Search
CPC ........... G01D 5/145; G01D 5/142; G01D 5/16
See application file for complete search history.

(56) References Cited

U.S. PATENT DOCUMENTS 4,038,814 A    8/1977  Niida
2006/0279279 A1  12/2006  Foley
(Continued)

FOREIGN PATENT DOCUMENTS

DE    10 2008 023 651 A1   11/2009
EP         1 734 370 A2    12/2006
(Continued)

OTHER PUBLICATIONS

International Search Report dated Jan. 21, 2016 in PCT/EP2015/071683 Filed Sep. 22, 2015.

*Primary Examiner* — Jermele M Hollington
*Assistant Examiner* — Alvaro E Fortich
(74) *Attorney, Agent, or Firm* — Oblon, McClelland, Maier & Neustadt, L.L.P.

(57) ABSTRACT

A position sensor and method for determining an axial and/or an angular position of a setting stem of a timepiece. A magnet is provided on the setting stem, and at least one magnetic field sensor is configured to detect changes in magnetic field strength along at least a first axis and a second axis as the rotatable element rotates; the second axis is not parallel to the first axis. The changing magnetic field sensed by the magnetic sensor is converted into a characteristic signature path which may then be mapped onto a circular signature path in two dimensions to derive the angular position of the setting stem.

17 Claims, 3 Drawing Sheets

(51) Int. Cl.
*G01S 5/22* (2006.01)
*G04C 3/00* (2006.01)
*G01S 5/18* (2006.01)

(56) References Cited

U.S. PATENT DOCUMENTS

| | | | |
|---|---|---|---|
| 2008/0012558 A1* | 1/2008 | Rossler | B82Y 25/00 |
| | | | 324/252 |
| 2008/0112275 A1 | 5/2008 | Born et al. | |
| 2008/0181059 A1 | 7/2008 | Wai | |
| 2010/0309756 A1 | 12/2010 | Kimura et al. | |
| 2012/0155223 A1* | 6/2012 | Hoover | G04C 3/146 |
| | | | 368/185 |
| 2012/0207001 A1* | 8/2012 | Pittet | G04B 17/30 |
| | | | 368/243 |

FOREIGN PATENT DOCUMENTS

| | | | |
|---|---|---|---|
| EP | 1 930 794 A1 | 6/2008 |
| EP | 1 953 613 A2 | 8/2008 |
| EP | 2 261 938 A2 | 12/2010 |

\* cited by examiner

POSITION SENSOR AND METHOD FOR DETERMINING A POSITION OF A TIMEPIECE SETTING STEM

TECHNICAL FIELD

The present invention relates to the field of sensing position and/or motion of a rotatable shaft of a timepiece. More specifically, but not exclusively, the present invention relates to a contactless sensor arrangement and method suitable for sensing the motion and/or position of a timepiece setting stem.

BACKGROUND OF THE INVENTION

In devices which combine mechanical moving parts and electronic control circuitry, such as electromechanical timepieces, there is a requirement for accurate sensors to sense the position and/or motion of rotating mechanical parts. For wristwatches having a rotatable setting stem, for example, an accurate and responsive sensor is required to detect the instantaneous angular position and/or rotation of the setting stem so that the watch-wearer's preferences can be converted quickly and accurately into electronic information which can be used by the watch's electronic control systems. Particularly in the field of wearable timepieces, it is important to maximise the accuracy and speed of such sensor, while minimising the power consumption. In addition, the small-scale nature of components such as the setting stem of a wristwatch means that rotation/motion sensors must be able to detect tiny movements of a tiny object, for example the rotation of a stem having a diameter of a few tenths of a millimeter. The sensor components must also themselves be small, since space is limited. Such sensors should preferably be contactless in order to reduce wear and thereby extend the serviceable life of the timepiece. The sensor components should also be easy to manufacture.

PRIOR ART

A contactless sensor has been proposed in U.S. Pat. No. 6,252,825, which describes the use of a sensor for detecting positions and/or movements of a setting stem of a timepiece. The setting stem is provided with a rotor electrode which is shaped so as to modulate a capacitance between two stator electrodes. The arrangement in U.S. Pat. No. 6,252,825 requires precise fabrication of a specially-shaped stem and capacitive electrodes. These take up precious space and require extra manufacturing steps.

SUMMARY OF THE INVENTION

It is an object of the present invention to provide a position sensor and method for determining an axial and/or an angular position of a rotatable element of a timepiece, in which a permanent magnet is arranged to rotate with the rotatable element about a rotation axis of the rotatable element, and a magnetic field sensor, static with respect to the timepiece, is arranged to detect changes in magnetic field strength, due to the rotation of the magnetic field lines of the permanent magnet, along at least a first axis and a second axis as the rotatable element rotates, the second axis being not parallel to the first axis.

According to another variant of the position sensor or method of the invention, the permanent magnet is arranged in a distal axial region of the rotatable element.

According to another variant of the position sensor or method of the invention, the permanent magnet is arranged in a circumferential region of the rotatable element.

According to another variant of the position sensor or method of the invention, the magnetic field sensor comprises at least three mutually non-parallel measurement axes.

According to another variant of the position sensor of the invention, the position sensor comprises a transform unit for performing a mapping transform between a first frame of reference to a second frame of reference.

According to another variant of the method of the invention, the method comprises performing a mapping transform between a first frame of reference to a second frame of reference.

According to another variant of the position sensor or method of the invention, the second frame of reference comprises a circular signature path in two dimensions.

According to another variant of the position sensor or method of the invention, the first frame of reference comprises an elliptical signature path in three dimensions.

According to another variant of the position sensor or method of the invention, the permanent magnet is arranged to move axially with the rotatable element during an axial movement of the rotatable element.

According to another variant of the position sensor or method of the invention, the rotatable element has at least a first and a second predetermined axial position, wherein a rotation of the rotatable element in the first predetermined axial position is associated with a first timepiece function, and a rotation of the rotatable element in the second predetermined axial position is associated with a second timepiece function or no timepiece function.

According to another variant of the position sensor or method of the invention, the magnetic sensor comprises a first sensing mode, in which the magnetic sensor is configured to detect the axial movement of the rotatable element, and a second mode, in which the magnetic sensor is configured to detect the rotation of the rotatable element.

According to another variant of the position sensor or method of the invention, the magnetic sensor is configured to perform sensing at a first resolution and/or at a first sampling rate when the position sensor is in the first sensing mode, and to perform sensing at a second resolution and/or at a second sampling rate when the position sensor is in the second sensing mode, wherein the first resolution is lower than the second resolution and/or the first sampling rate is lower than the second sampling rate.

According to another variant of the position sensor or method of the invention, the position sensor comprises a shielding arranged for shielding components of the timepiece from the magnetic field of the permanent magnet.

According to another variant of the position sensor or method of the invention, the rotatable element comprises a setting stem of the timepiece.

The proposed new solution enables reduced wear, reduced power consumption, a more precise and more accurate measurement of the angular position, and a faster responsiveness to user-actuated changes in timepiece settings, with a high resolution while requiring simpler manufacturing and taking up less space on a small dimensional scale. It also allows to additionally provide axial position detection on top of angular detection, so that no more dedicated other sensor is needed to this end anymore, hence saving additional available space for further elements or modules to be integrated into a watch casing.

BRIEF DESCRIPTION OF THE DRAWINGS

Other features and advantages of the invention will become apparent from the following description of a nonlimiting exemplary embodiment, which is described with reference to the appended drawings, in which.

DETAILED DESCRIPTION OF AN EMBODIMENT OF THE INVENTION

Figure 1:
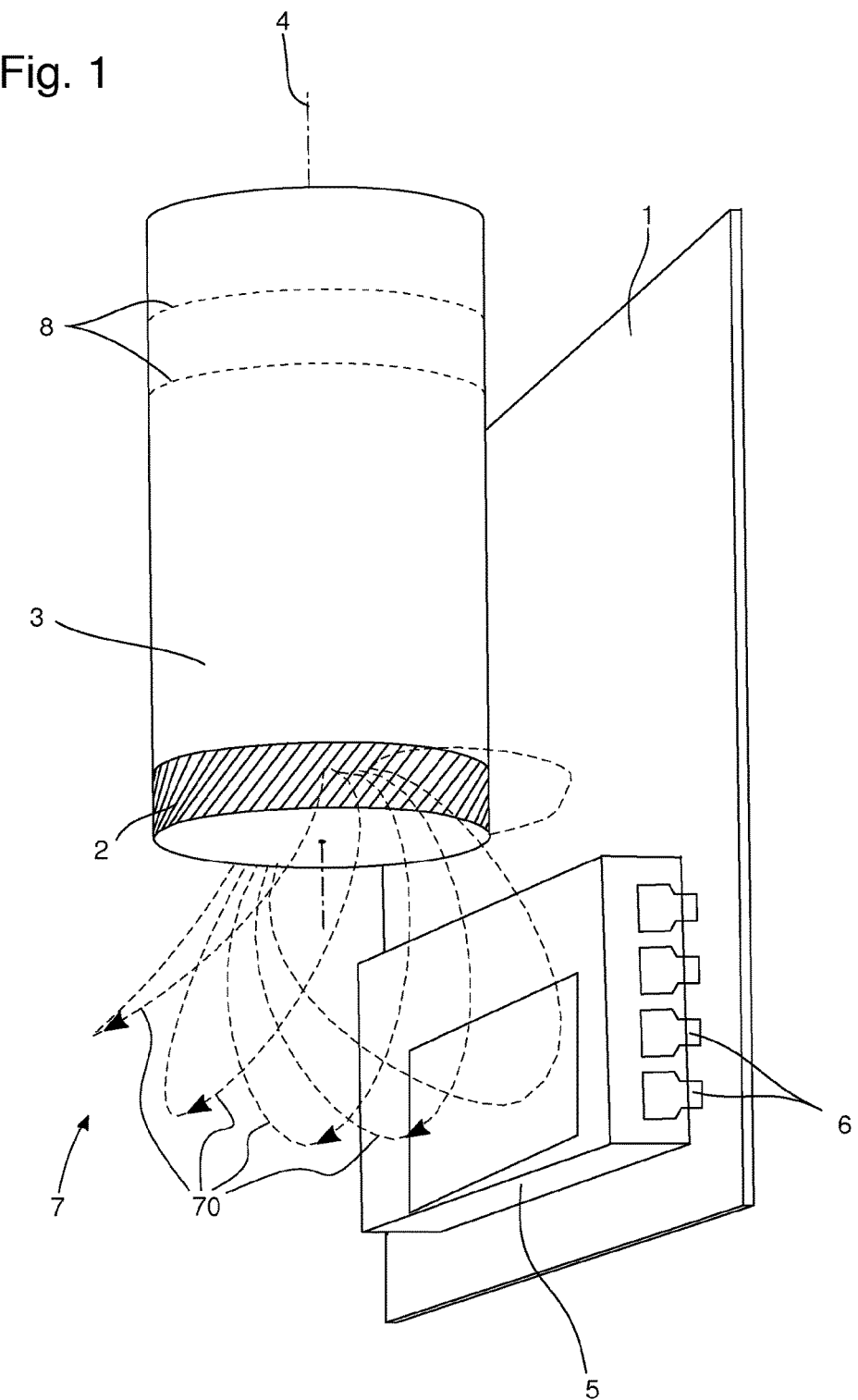
FIG. 1 shows a schematic isometric illustration of an example setting stem and sensor according to the present invention.

An embodiment of the present invention will now be described in detail, with reference to the attached figures. Identical or corresponding functional and structural elements which appear in the different drawings are assigned the same reference numerals. The drawings are not to scale, and are not intended to convey any relative or absolute dimensions.

FIG. 1 shows an example of a rotatable element 3, preferably mounted on a setting stem which may be found in a timepiece. The rotatable element 3 has a rotation axis 4. In the preferred embodiment described hereunder, a setting stem of a wristwatch will be taken as an illustrative example of an application of the position sensor of the invention, wherein the rotatable element just consists of a part of the setting stem. A setting stem may also be known as a crown stem. Thus, the rotatable element 3 of this example would be a small piece, with a diameter of 0.5 mm or 1 mm, for example. FIG. 1 only shows the distal end portion of such a setting stem. The rotatable element 3 is provided with a magnet 2 attached at its distal end (i.e. in the case of a setting stem terminated by a crown, at the end of the setting stem opposite to the crown). The magnet is shown as a broad cylinder of the same diameter as the rotatable element 3, because this configuration occupies minimum extra space. However, in practice the magnet may have any practical shape. The polarity of the magnet 2 is indicated in FIG. 1 by dashed lines representing the magnetic field lines 70 of the magnet 2. The magnet 2 preferably comprises a permanent magnet, for example, comprising a ferromagnetic or ferrimagnetic or other magnetic material, but it may also alternatively comprise a piece of magnetisable material such as a ferrous metal which has, or acquires a magnetisation.

The magnetic field lines 70 impinge on a magnetic field sensor 5, which may for example be a two-axis or three-axis sensor measuring the incident magnetic field 7 along two or three measurement axes. The magnetic sensor 5 may for example be a miniature surface-mount device (SMD) fitted to a printed circuit board (PCB) 1 and connected to the PCB via SMD connections 6. The magnitude and orientation of the magnetic field lines 7 detected by the magnetic sensor 5 as the rotatable element 3 rotates through a full rotation form what will be referred to as a signature path, which effectively comprises a succession of magnitude/orientation data points. Each of the data points on the signature path (i.e. each instantaneous measured magnitude/orientation datum) corresponds to a unique angular orientation of the rotatable element 3. As will be discussed below, the sensor may thus be provided with a means for deducing the angular orientation of the rotatable element 3 from the measured magnitude and orientation of the magnetic field, for example by referring to a lookup table or by performing a calculation.

The setting stem of a timepiece such as a wristwatch may typically be movable between multiple axial positions. These may include for example a home position, in which the setting function of the stem is disabled, a time setting position, in which the rotation of the stem is used to set the time displayed by the timepiece, and a date setting position, in which the rotation of the stem is used to set the date displayed by the timepiece. These axial positions are indicated symbolically by reference 8 in FIG. 1. If the rotatable element 3 is also axially moveable between discrete axial positions in such a manner, then the signature path referred to above may be used to deduce not only the angular orientation of the rotatable element 3, but also its axial position 8, especially thanks to the change of magnitude of the magnetic field 7 when passing from one discrete axial position to another. The more space between each axial position is provided, the better the leap between magnitude values can be detected.

In order to reduce power consumption, the position sensor may be arranged so that, when the rotatable element 3 is in its home axial position (i.e. the setting function is disabled), the output of the magnetic sensor 5 is sampled infrequently and/or at a coarse resolution, since the only requirement when in this state is to detect when the rotatable element 3 is moved to an axial position 8 other than the home axial position. The infrequent sampling may be carried out once a second, for example. Then, when coarse and/or infrequent sampling detects that the rotatable element 3 is in the other axial position 8, or one of the other axial positions 8, the sampling of the magnetic sensor output may then be carried out at a higher rate and/or at a higher resolution while the setting function is enabled. The position sensor may thus be operated in an axial-detection mode, in which case the sampling rate and/or sensor resolution is relatively low, or a rotation-detection mode, in which the sampling rate and/or sensor resolution is higher.

Figure 4:
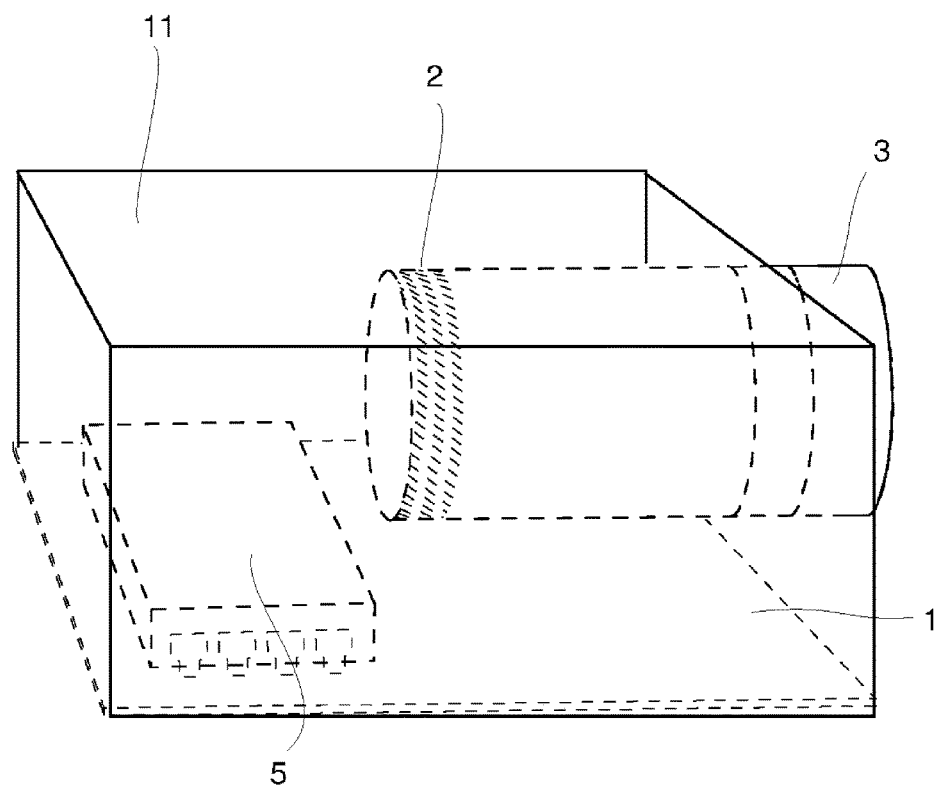
FIG. 4 shows a shielding arrangement for the sensor of FIG. 1.

The magnet 2 and/or the magnetic sensor 5 may be fully or partially enclosed within a magnetic shielding 11, as shown for example in FIG. 4. Such a shielding 11 may help to improve the accuracy of the position sensor by protecting the magnetic sensor 5 against stray magnetic fields from external magnetic sources, or even from other elements of the timepiece. Such shielding 11 may also help to protect other parts of the timepiece against becoming magnetised as a result of being near to the magnet 2.

Figure 2:
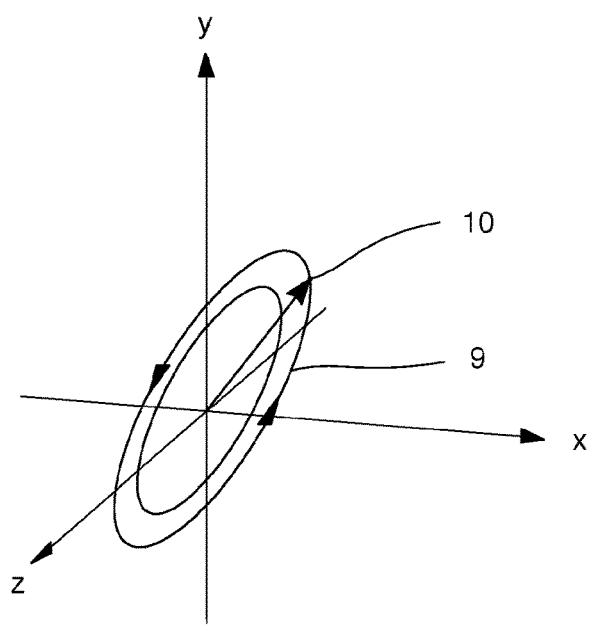
FIG. 2 shows a simplified example of a three-dimensional magnetic rotation signature path resulting from a rotation of the setting stem of FIG. 1.
Figure 3:
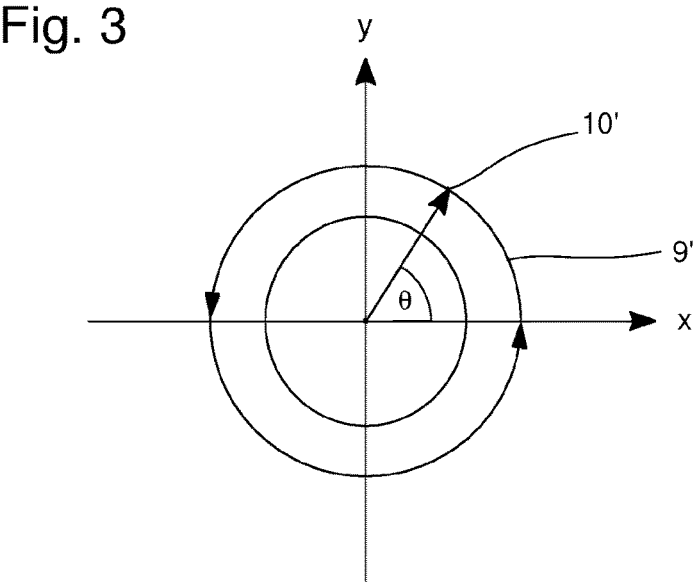
FIG. 3 shows a transform into two dimensions of the magnetic rotation signature path of FIG. 2.

The position sensor may comprise a transform unit (not shown in FIG. 1) for performing a mapping or transform operation between the magnetic field parameters detected by the magnetic sensor 2 and the rotational and/or axial position of the rotatable element 3. Alternatively, the mapping/transform function may be carried out by a separate device, such as a central processing unit (CPU) of the timepiece. FIG. 2 shows a simplified graphic representation of a three-dimensional signature path (for example a set of data points from a three-axis magnetic sensor 2) corresponding to a rotation of the magnet 2 and the rotatable element 3. FIG. 3 shows how the 3D signature path of FIG. 2 may appear when mapped on to a two-dimensional signature path. In this case, the mapping/transformation has been carried out such that the resulting 2D signature path is circular. This has the advantage that the angular position of the rotatable element may be deduced directly from the 2D data, without further calculation. For example, when a point 10 on the 3D signature path 9 maps onto a point 10' on the 2D signature path 9', the angular position may be simply derived from the angle $\theta$ subtended by the point 10' relative to the x-axis.

The transform unit may perform a mathematical transform operation (such as a matrix transform, for example) in order to map the magnetic sensor output data (e.g. 3D signature path 10) on to the (preferably circular) 2D signature path. According to the preferred embodiment illustrated on FIGS. 2 and 3, this mapping corresponds to a projection of the 3D coordinates of FIG. 2 onto a plane orthogonal to the rotation axis 4. Alternatively, the mapping function may be defined in a correspondence table such as a look-up table. The former solution may provide a more accurate transformation, while the latter may be faster and require less power. These are simply examples; other mapping or transformation methods are possible.

While the invention has been described with reference to a particular example embodiment, it should be understood that many other configurations of the constituent elements are possible. For example, the magnet 2 shown in FIG. 1 as being located at the end of rotatable element 3 may alternatively be located in or on a peripheral surface of the rotatable element 3. In this case, the magnetic field lines would provide a different type of signature path, and would require a different type of transform operation in order to map the source signature path 9 on to a transformed (preferably circular) signature path 9'. Similarly, the magnetic sensor 5 may be mounted in one of many different positions relative to the rotatable element 2. It is also possible to use more than one magnetic sensor 5, and/or more than one magnet 2. Moreover, despite the fact that the permanent magnet 2 is, according to the preferred embodiment illustrated by the figures, preferably associated with a rotatable element 3 and the magnetic field sensor 5 accordingly preferably arranged to be static with respect to the timepiece, it can be appreciated that it is only essential that a relative rotational and/or axial movement between the permanent magnet 2 and the magnetic sensor 5 is provided to detect magnetic field 7 strength changes, so that according to an alternative embodiment, the magnet 2 and the sensor 5 could be swapped to be respectively arranged on a fixed element of the timepiece and on a rotatable element 3.

It will also be understood that since the invention provides an absolute angular position sensor and position detection method, incremental detection of position changes are also provided, e.g. by simply computing the difference between consecutive detected angular and/or axial positions.

The invention claimed is:

1. A position sensor for determining an axial and/or an angular position of a rotatable element of a timepiece, the position sensor comprising:
   a permanent magnet configured to rotate with the rotatable element about a rotation axis of the rotatable element;
   a magnetic field sensor, static with respect to the timepiece and configured to measure a magnitude and an orientation of an incident magnetic field along at least a first axis and a second axis, and detect changes in the magnetic field magnitude and orientation, due to rotation of the magnetic field of the permanent magnet, along the first axis and the second axis as the rotatable element rotates, the second axis being not parallel to the first axis;
   means for deducing angular orientation from the measured magnitude and orientation of the magnetic field.

2. The position sensor according to claim 1, wherein the permanent magnet is arranged in a distal axial region of the rotatable element.

3. The position sensor according to claim 1, wherein the permanent magnet is arranged in a circumferential region of the rotatable element.

4. The position sensor according to claim 1, wherein the magnetic field sensor comprises at least three mutually non-parallel measurement axes.

5. The position sensor according to claim 1, further comprising a transform unit to perform a mapping transform between a first frame of reference to a second frame of reference.

6. The position sensor according to claim 5, wherein the second frame of reference comprises a circular signature path in two dimensions.

7. The position sensor according to claim 5, wherein the first frame of reference comprises an elliptical signature path in three dimensions.

8. The position sensor or method according to claim 1, wherein the permanent magnet is configured to move axially with the rotatable element during an axial movement of the rotatable element.

9. The position sensor according to claim 8, wherein the rotatable element has at least a first and a second predetermined axial position, wherein a rotation of the rotatable element in the first predetermined axial position is associated with a first timepiece function, and a rotation of the rotatable element in the second predetermined axial position is associated with a second timepiece function or no timepiece function.

10. The position sensor according to claim 8, wherein the magnetic sensor comprises a first sensing mode, in which the magnetic sensor is configured to detect the axial movement of the rotatable element, and a second sensing mode, in which the magnetic sensor is configured to detect the rotation of the rotatable element.

11. The position sensor according to claim 10, wherein the magnetic sensor is configured to perform sensing at a first resolution and/or at a first sampling rate when the position sensor is in the first sensing mode, and to perform sensing at a second resolution and/or at a second sampling rate when the position sensor is in the second sensing mode, wherein the first resolution is lower than the second resolution and/or the first sampling rate is lower than the second sampling rate.

12. The position sensor according to claim 1, further comprising a shielding arranged around the position sensor to shield components of the timepiece from the magnetic field of the permanent magnet.

13. The position sensor or method according to claim 1, wherein the rotatable element is assembled to, or unitary with, a setting stem of the timepiece.

14. A method of determining a position of a rotatable element of a timepiece, the method comprising:
   arranging a permanent magnet to rotate with the rotatable element about a rotation axis of the rotatable element;
   using a magnetic field sensor to measure a magnitude and an orientation of an incident magnetic field along at least a first axis and a second axis and detect changes in the magnetic field magnitude and orientation, due to rotation of the magnetic field of the permanent magnet, along the first axis and second axis as the rotatable element rotates, the second axis being not parallel to the first axis;
   deducing the angular orientation from the measured magnitude and orientation of the magnetic field.

15. The method according to claim 14, further comprising performing a mapping transform between a first frame of reference to a second frame of reference.

16. The method according to claim 14, wherein the second frame of reference comprises a circular signature path in two dimensions.

17. The method according to claim 14, wherein the first frame of reference comprises an elliptical signature path in three dimensions.

\* \* \* \* \*